United States Patent [19]

Gray

[11] Patent Number: 5,719,582
[45] Date of Patent: Feb. 17, 1998

[54] SOFTWARE/HARDWARE DIGITAL SIGNAL PROCESSING (DSP) ALTIMETER

[75] Inventor: Kimberly J. Gray, Zimmerman, Minn.

[73] Assignee: Honeywell Inc., Minneapolis, Minn.

[21] Appl. No.: 733,215

[22] Filed: Oct. 17, 1996

Related U.S. Application Data

[63] Continuation of Ser. No. 327,266, Oct. 21, 1994, abandoned.

[51] Int. Cl.⁶ ..................................... G01S 13/08
[52] U.S. Cl. ................ 342/120; 342/121; 342/145
[58] Field of Search ............................. 342/120, 121, 342/135, 195, 145

[56] References Cited

U.S. PATENT DOCUMENTS

| | | | |
|---|---|---|---|
| 4,509,049 | 4/1985 | Haendel | 342/87 |
| 4,568,938 | 2/1986 | Ubriaco | 342/87 |
| 4,594,676 | 6/1986 | Breiholz et al. | 364/565 |
| 4,945,360 | 7/1990 | Trummer et al. | 342/122 |
| 4,958,161 | 9/1990 | Allezard | 342/122 |
| 5,014,063 | 5/1991 | Studenny | 342/130 |
| 5,016,016 | 5/1991 | Strauch | 342/87 |
| 5,046,010 | 9/1991 | Tomasi | 364/433 |
| 5,047,779 | 9/1991 | Hager | 342/120 |
| 5,072,223 | 12/1991 | Hethuin et al. | 342/122 |
| 5,150,125 | 9/1992 | Hager | 342/120 |

*Primary Examiner*—John B. Sotomayor
*Attorney, Agent, or Firm*—Thomas A. Rendos; Albert K. Kau

[57] ABSTRACT

A radar altimeter system uses a microprocessor-based subsystem to process radar signals in software. The subsystem includes a track loop and a verify loop for digital signal processing of the radar signals. The track loop generates a gate pulse and integrates a radar return signal over the time window defined by the gate pulse in order to determine the leading edge of the return pulse. The verify loop positions the gate pulse for maximum overlap with the return pulse and integrates the return pulse over the gate pulse to determine the maximum signal strength of the radar return signal.

5 Claims, 19 Drawing Sheets

SOFTWARE/HARDWARE DIGITAL SIGNAL PROCESSING (DSP) ALTIMETER

This application is a continuation, of application Ser. No. 08/327,266, filed Oct. 21, 1994, now abandoned.

FIELD OF THE INVENTION

The present invention relates to radar altimeter systems and more particularly relates to a software-based system for digital signal processing of radar altimeter signals.

BACKGROUND OF THE INVENTION

Radar altimeters use electromagnetic waves to determine the distance to a target. The radar altimeter typically transmits a pulsed RF signal to the target and receives reflected return signals. The time delay between the transmitted and reflected signals provides an indication of the distance to the target. The radar altimeter processes the analog radar signals with hardware components to calculate the time delay and convert it into a distance measurement.

Processing of the signals usually involves several different functions. An acquisition loop performs the initial conditioning of the reflected return signal. A track loop uses hardware filters, integrators, and comparators to process the reflected signal and output the distance measurement. A level adjust loop is used for calibration. Finally, a noise control loop uses hardware filtering and signal conditioning for suppressing noise on the return signal.

Each of these loops uses separate hardware components for performing their functions. A hardware-based system can thus become quite complex and have a high chip count due to all the individual hardware components required to execute the functions of the radar altimeter. A hardware-based system can also be somewhat inflexible, since changing or adding more functionality or loops to the system requires changing or adding hardware components, because different altitudes require drastically different functional parameters.

A need exists, therefore, for a radar altimeter system with increased flexibility and a reduced chip count.

SUMMARY OF THE INVENTION

This invention is a microprocessor-based system for analyzing and processing radar altimeter signals. The microprocessor includes embedded software which uses digital signal processing to perform the acquisition, track, level adjust, and noise control loops. The software effectively replaces many hardware components typically used to perform these functions, which results in a reduced chip count. The software further provides increased flexibility; additional functionality or modifications to the existing functions are implemented with modifications to the software, as opposed to adding additional hardware components.

The system receives analog reflected return signals and converts them into corresponding digital signals. The microprocessor receives the digital signals. The embedded software instructs the microprocessor to process the digital signals in order to generate an output indicative of the distance between the associated radar altimeter system and a target.

An alternate embodiment includes the microprocessor-based system within a complete radar altimeter system.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

RADAR ALTIMETER SYSTEM

Figure 1A:
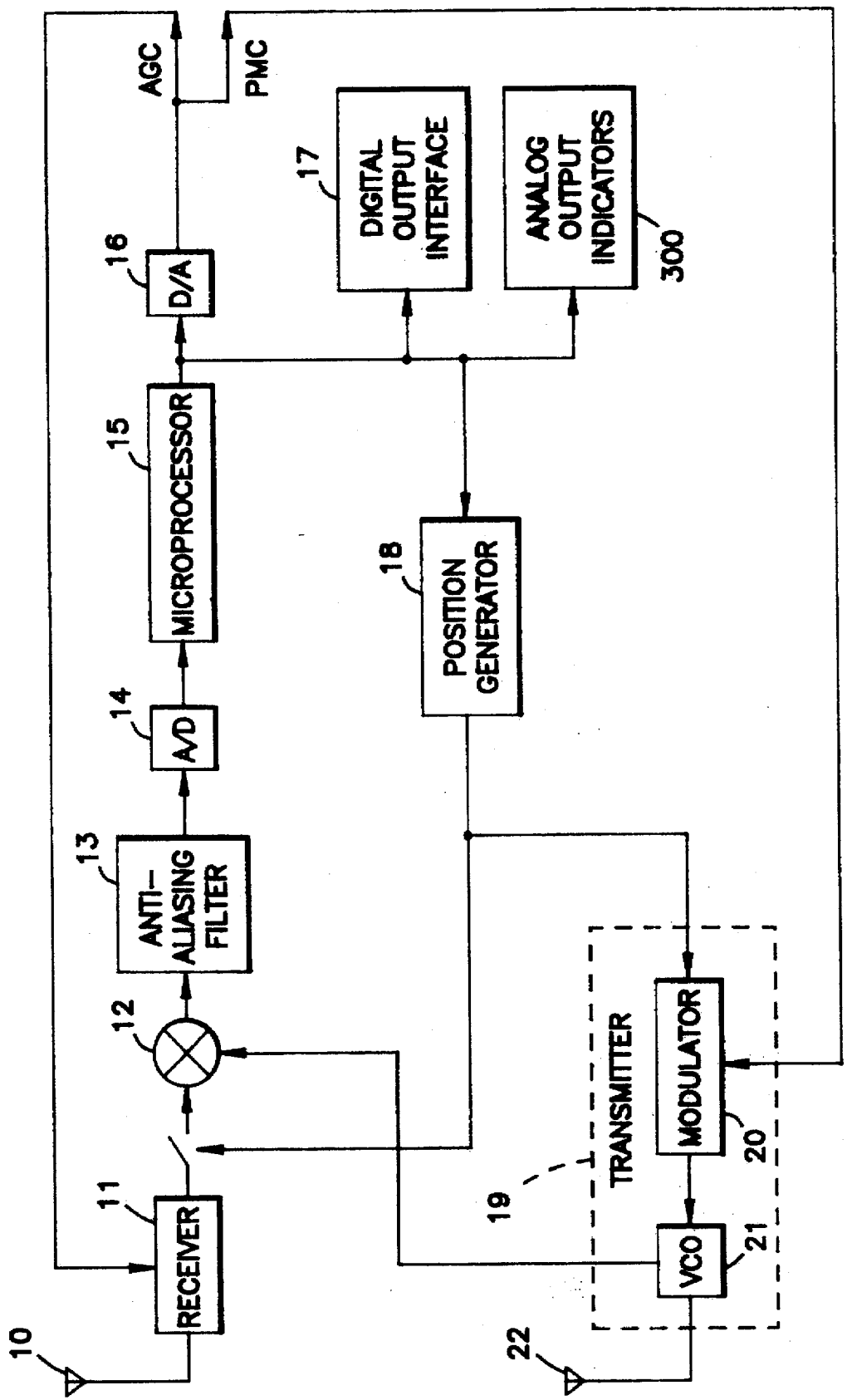
FIG. 1A is a block diagram of a radar altimeter system that incorporates the present invention.

FIG. 1A is a block diagram of a radar altimeter system that incorporates the present invention. Such a radar altimeter system is typically used in an aircraft, for example, and determines the distance between the aircraft and a ground target. The system determines the distance by transmitting an electromagnetic signal toward the target and processing received reflected signals. Typical systems within the art process the received signals in hardware. This invention improves upon these systems by replacing many hardware functions with software and a microprocessor.

Microprocessor 15 is at the heart of the system. Software within the microprocessor 15 replaces many of the functions that are typically performed in hardware in systems within the art. The software also provides greater flexibility by using digital signal processing techniques that are easily tailored to a specific situation by modifications to the software. The parameters used by the software in performing digital signal processing, for example, are easily modified by changing values of these parameters.

Microprocessor 15 generates output signals that control a transmitter 19. The output digital signals are first converted to corresponding analog signals by digital-to-analog converter 16. The microprocessor 15 controls the transmitter 19 via a position generator 18 and a power management control routine (PMC). Transmitter 19 includes a modulator 20 and oscillator 21, typically a voltage controlled oscillator, that drive a transmitting antenna 22. The oscillator 21 provides a variable frequency output, as controlled by the modulator 20, that causes the antenna 22 to transmit a beam of energy toward the target.

A receiver 11 and receiving antenna 10 receive reflections of the transmitted beam from the target. Receiver 11 controls the antenna 10 and performs initial filtering and amplification of the received signal. The microprocessor 15 controls the level or strength of the received signal via an automatic gain control (AGC) routine. The received signal, after sampling by the position generator 18, is next transmitted to a mixer 12, which mixes the received signal with the demodulation signal from the oscillator 21. The output of the mixer 20 is filtered by low pass or anti-aliasing filter 13, which removes frequencies higher than twice the sampling frequency of the analog-to-digital converter in order to prevent the higher frequencies to "wrap back" into to the lower frequency region and bias the input signal. The filtered difference signal is then converted to a corresponding digital signal by analog-to-digital converter 14 for processing by the microprocessor 15.

Upon processing the digitized difference signal to determine the distance to the target, microprocessor 15 can generate an output signal to a digital interface 17 in order to provide a visual indication of the distance to the target. The microprocessor 15 can also generate output signals to analog output indicators 300. The output signal of the microprocessor that indicates the distance can also be transmitted to other devices that use an altitude measurement as an input.

Figure 1B:
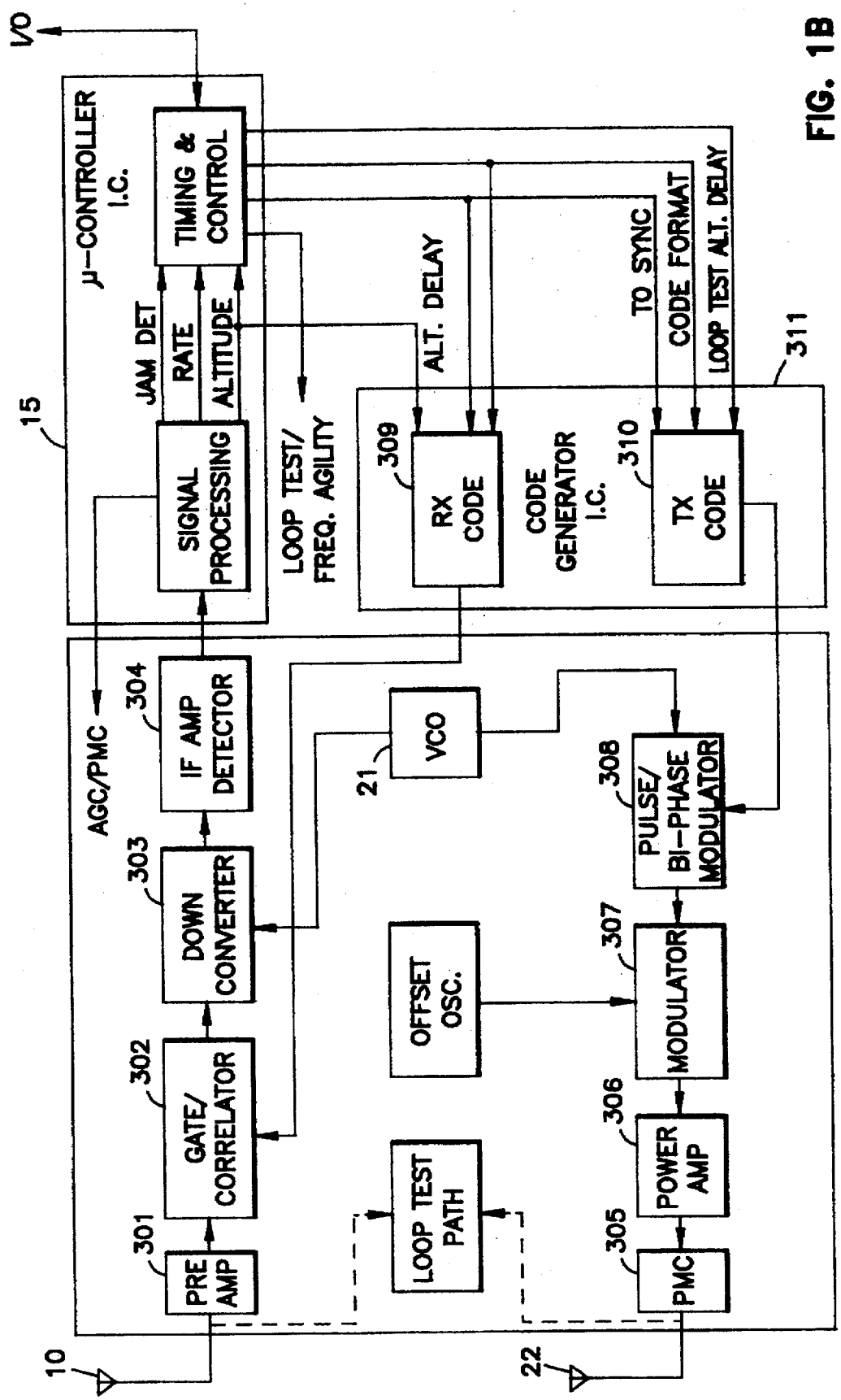
FIG. 1B is a block diagram of the radar altimeter system, which shows additional detail of the transmitter and receiver sections.

FIG. 1B is a block diagram of the radar altimeter system that shows more detail of the transmitter and receiver sections. The microprocessor 15 uses code generator circuitry 311 for controlling the receiver and transmitter. The code generator circuitry 311 includes circuit 309 for generating receiver codes and circuit 310 for generating transmitter codes. The codes used by the system may depend upon a particular application of the radar altimeter.

A preamp 301 provides initial amplification and buffering of the received signals. The receiver codes control a gate/ correlator 302, which receives signals from the preamp 301. The received signals are then delivered through a down converter 303 and an IF amp-detector 304 before processing by the microprocessor 15. The transmitter codes control a modulator 308. The output of modulator 308 is transmitted to another modulator 307. Amplifier 306 receives the modulated signal and provides the necessary power for driving the transmitter antenna 22. The PMC function 305 controls the output power level.

RADAR ALTIMETER SIGNALS

Figure 2:
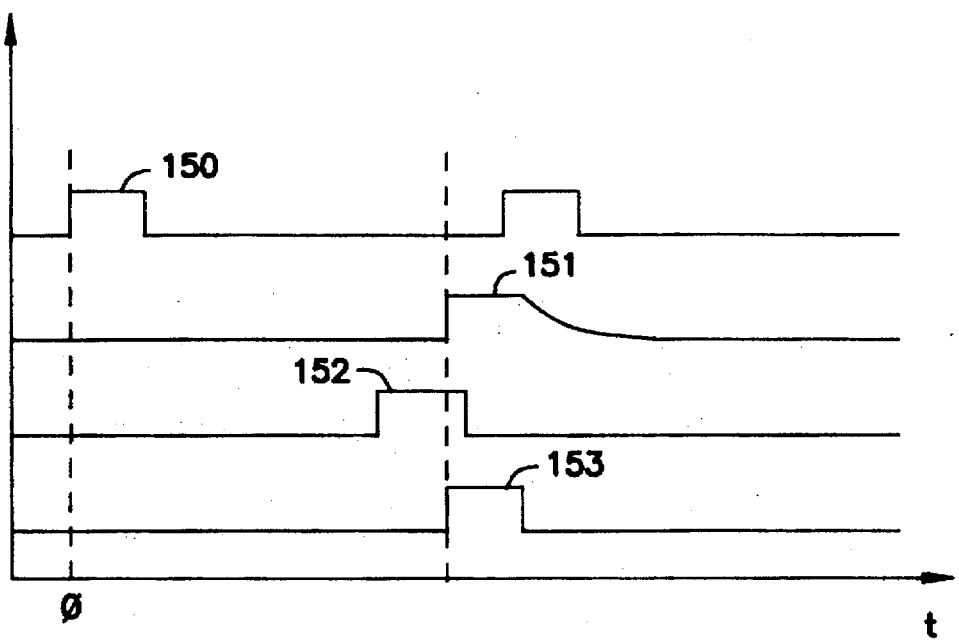
FIG. 2 is a diagram of the basic transmitted and received radar altimeter signals.

FIG. 2 is a diagram of the basic transmitted and received radar altimeter signals. Pulse 150 represents the transmitting pulse, originating at time t=0. Pulse 151 represents the return pulse generated by reflections of the transmitted pulse from the target. Pulse 152 represents the gate pulse for the track routine. The system integrates the return signal over the time period (window) determined by the track gate pulse 152 in order to detect the leading edge of the return pulse. The system can also determine the received noise level by processing received signals when no transmitted pulse has been generated.

Pulse 153 represents the gate pulse for the verify routine; this pulse preferably has the same duration as pulse 152. The system positions the verify gate pulse 153 for maximum overlap with the return pulse and then integrates the return pulse over the verify gate pulse 153 to determine the strength of the return signal. The verify gate pulse 153 allows the system to determine, by calculating return pulse energy, whether the return pulse can be tracked or whether it is noise.

The track gate pulse also provides the system with an indication of where to position the track gate pulse along the return signal. The system can determine via the track gate pulse if the strength of the return signal is increasing or decreasing over time. An increasing return signal strength may indicate that the target is moving closer to the altimeter, and the amount of the increase in return signal strength can provide an indication of the rate at which the target is moving closer to the altimeter. By repeatedly calculating return signal strength the system can thus determine where to position the track gate pulse, since it can anticipate when it will receive a return signal.

Figure 3:
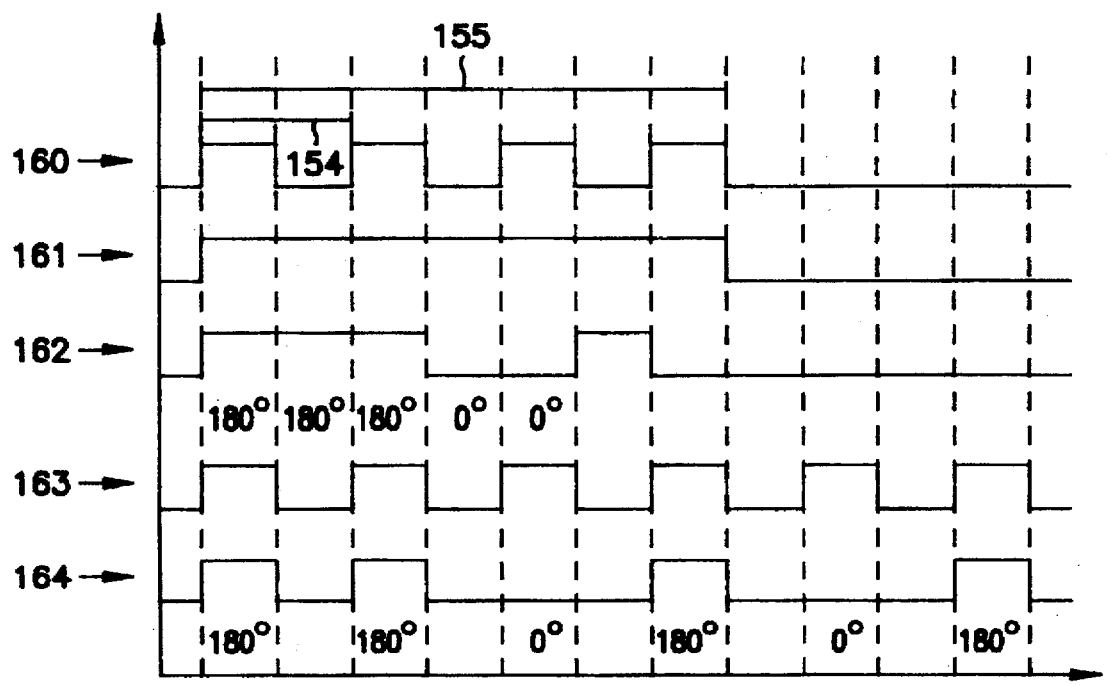
FIG. 3 is a diagram of the types of transmitted signals used by the radar altimeter system.

FIG. 3 is a diagram of the types of transmitted signals used by the radar altimeter system. Transmitted signal 160 represents a pulse train with a series of pulses analogous to pulse 150. Each of the individual pulses is referred to as a "chip." Interval 154 represents the pulse repetition interval (PRI). Interval 155 represents the word repetition interval (WRI); four pulses are shown in the WRI of signal 160 as an example only.

The search routine used by the system (explained below) depend upon whether the transmitted signal is embedded or nonembedded. An embedded code comprises numerous "chips" transmitted one right after another. A nonembedded code comprises transmitted "chips" repeated by the PRI distance. Signal 161 represents an embedded transmitted signal. Signal 162 represents the phase of transmitted signal 161. Signal 163 represents a nonembedded transmitted signal. Signal 164 represents the phase of transmitted signal 163.

Figure 4:
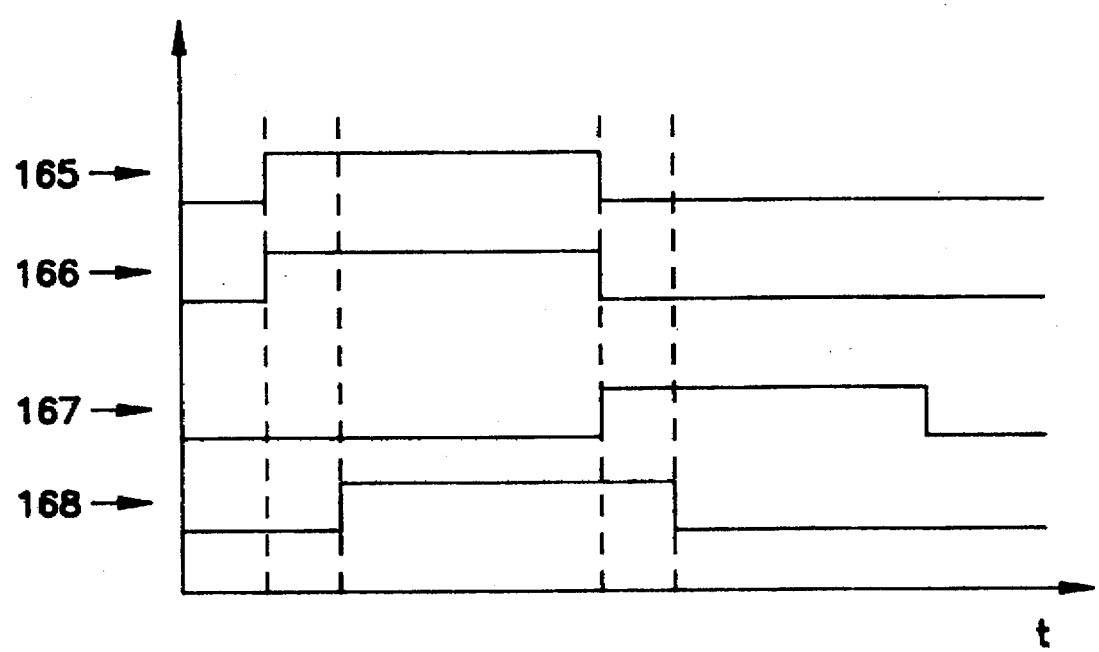
FIG. 4 is a diagram showing the overlap of the return signal and gate signal.
Figure 5:
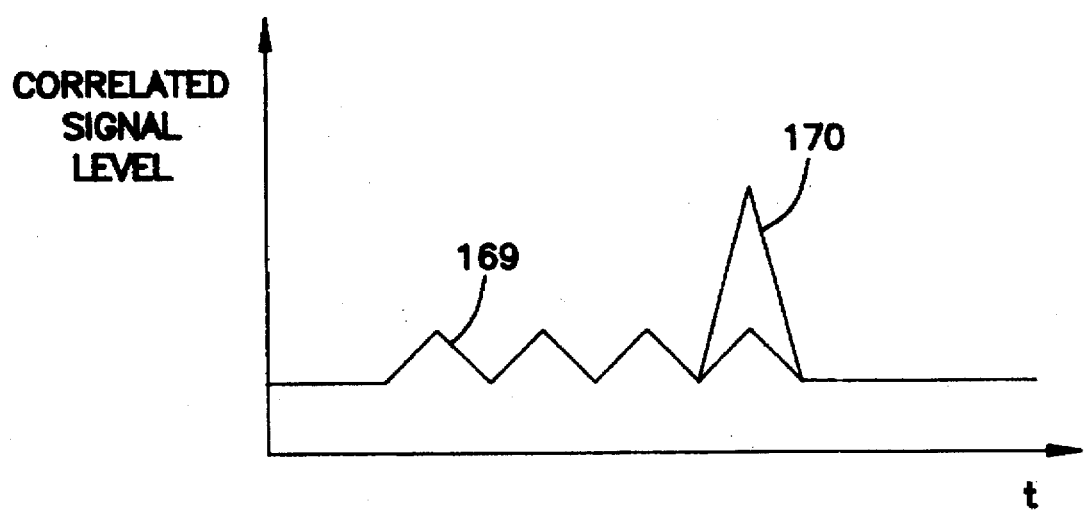
FIG. 5 is a diagram illustrating the correlation of the signals shown in FIG. 4.

FIG. 4 is a diagram showing the overlap of the return signal and the gate signal. FIG. 5 is a diagram illustrating the correlation of the signals shown in FIG. 4. The system preferably positions the gate pulse for full overlap with the return pulse in order to determine the maximum return signal strength. Full overlap is shown by return signal 165 and corresponding gate signal 166. The correlation signals 165 and 166 produces pulse 170, which corresponds to maximum return signal strength. In comparison, return signal 167 and gate signal 168 show an overlap of only one chip, and correlation of the one chip overlap results in pulse 169. The number of lower correlation peaks may vary with the number of the "chip" code used on the embedded format. The distance or signal strength difference between the lower and higher peaks also varies according to the type and length of code implemented.

SOFTWARE FUNCTIONS

Figure 6:
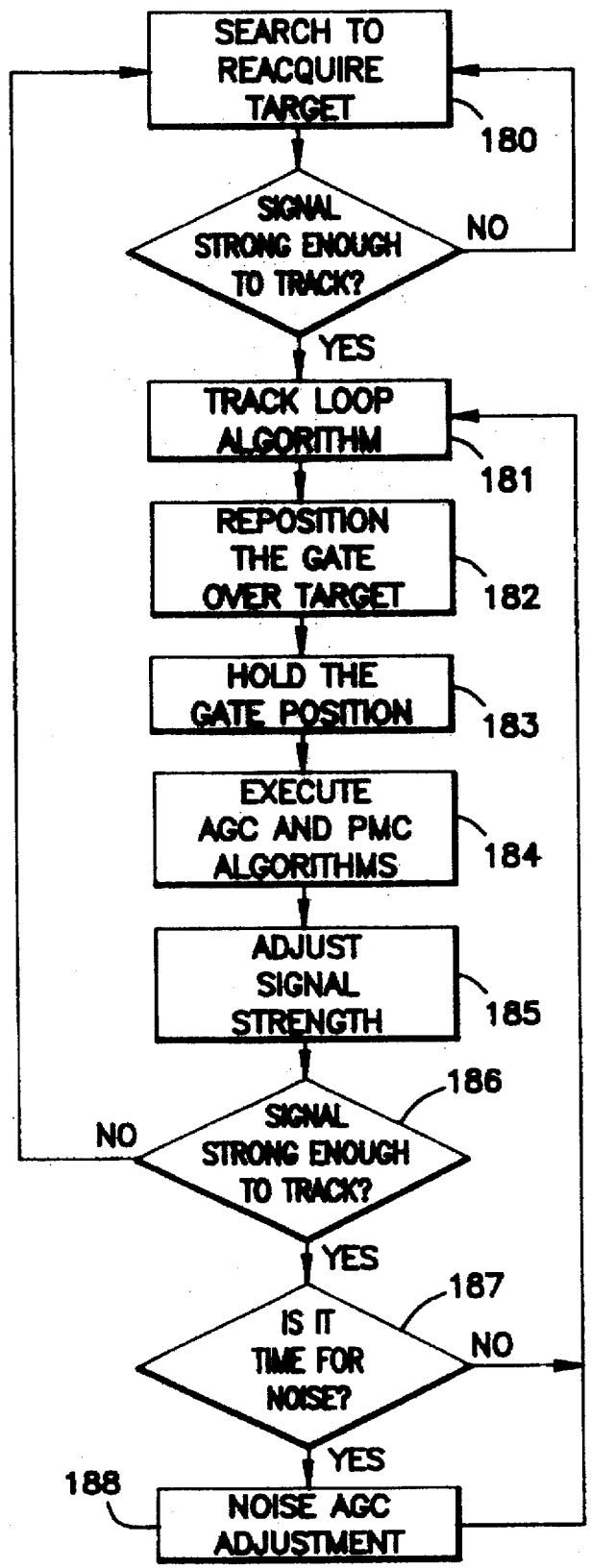
FIG. 6 is a general flow chart of the basic functions of the radar altimeter system.

FIG. 6 is a high level flow chart of the basic functions of the radar altimeter system. The system searches, at step 180, for a target by generating radar signals and received return signals. At step 181, the system executes a trackloop algorithm, a primary function of which is to process the return signal by integrating it with a gate signal to determine the leading edge of the return signal and thus determine the distance to the target. At steps 182 and 183, the system repositions the gate signal over the return signal, preferably with maximum overlap of the signals, and then holds the gate signal. The system executes the AGC and PMC routines at step 184 to analyze and determine the strength of the return signal. Knowing the received signal strength, the system can adjust the received signal strength at step 185 for additional processing. At step 186, the system analyzes the received signal strength to determine if the received signal is a valid return signal or if it is noise. If the received signal is considered noise, the system returns to step 180 to search for the target again. Otherwise, if the received signal is a valid return signal, the system next determines, at step 187, if it needs to adjust the noise level. If necessary, the system adjusts the noise level at step 187. Finally, the system returns to step 181 to repeat the process of tracking the target and processing the return signals.

Figure 7:
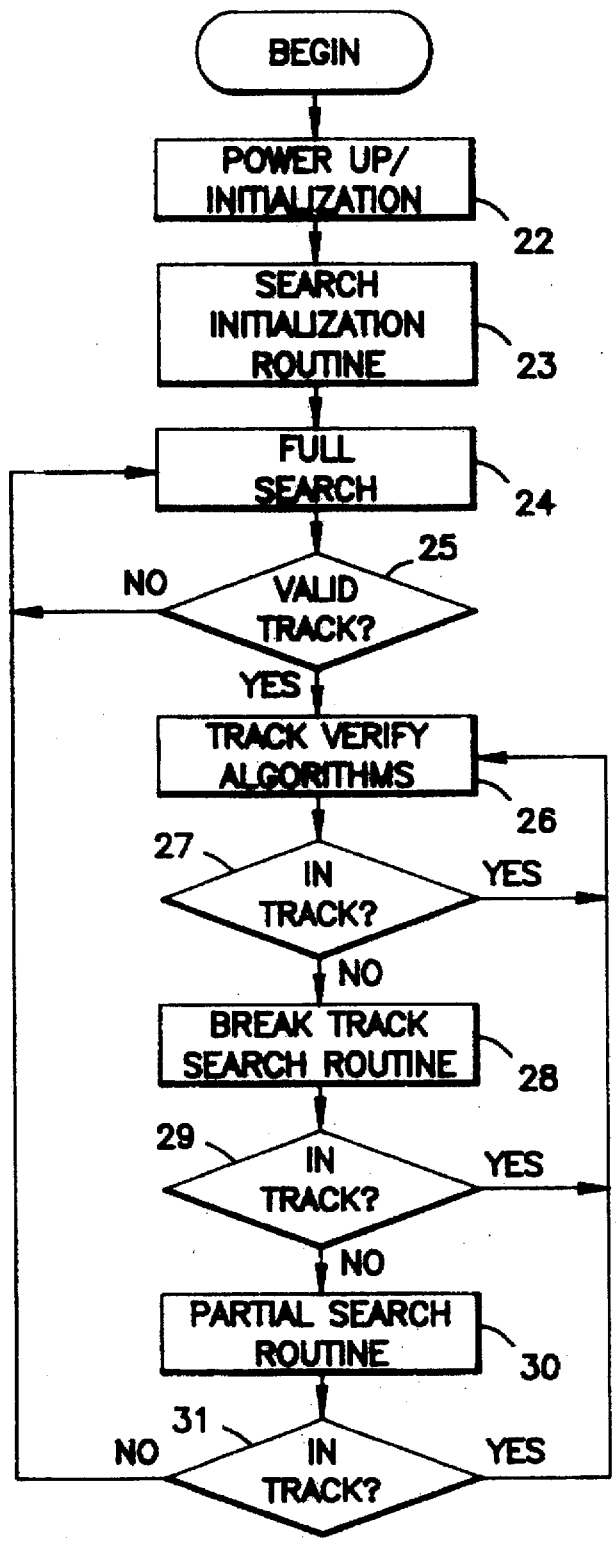
FIG. 7 is a flow chart of the main functions of the microprocessor within the radar altimeter system.

FIG. 7 is a general block diagram of the main software functions executed by the microprocessor 15. The system performs the power up, initialization, and system stabilization at step 22 as required by the microprocessor. At step 23, the system initializes the main (full) search routine, and at step 24 the system performs the full search routine. The full search routine typically searches for the target starting at zero feet. The system can also limit the search range based on, for example, a previous distance measurement.

If the full search routine does not find the target, then the system at step 25 returns to step 24 to re-execute the full search. If the system finds the target with the full search routine, then it performs the track/verify algorithms 26 to verify position and signal strength of the target. If the track verify algorithms do not maintain a valid target reading, then the system can perform the break track search routine 28 to find the target; if the break track search routine does not result in a valid target reading, then the system can perform a partial search routine 30. If the system still does not obtain a valid target reading, it can return to the full search routine 24; otherwise, it returns to step 26 to verify the target reading from the partial search routine.

Figure 8A:
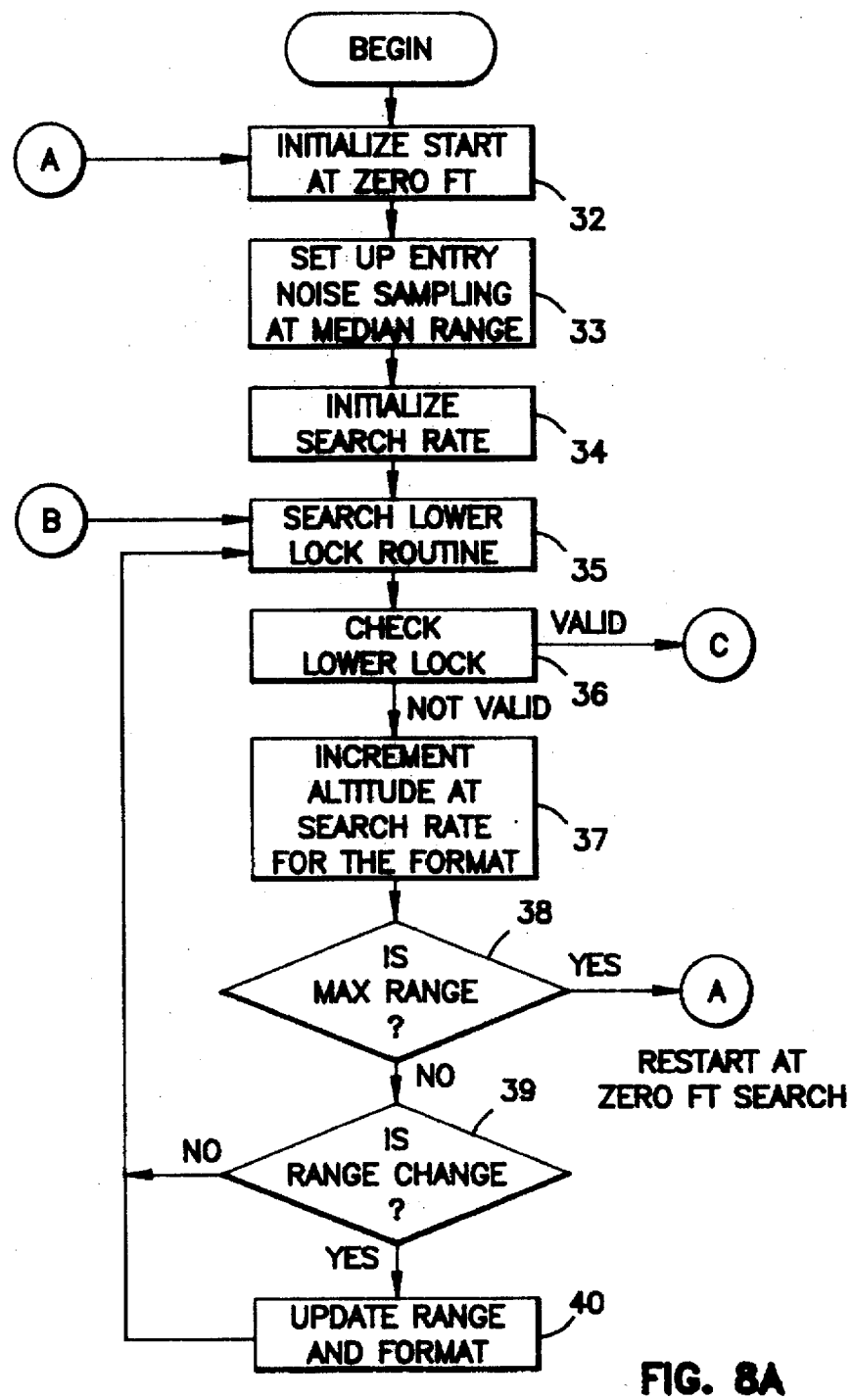
FIG. 8A is a flow chart of the main search routine.

FIG. 8A is a general flow chart of the full search routine 24. Steps 32–34 initialize the search routine: step 32 starts the search from zero feet; step 33 sets up the noise sampling and median range parameters; and step 34 initializes the search rate. After initialization, the system searches the lower lock routine 35, which is the main search routine and searches for the target starting at zero feet.

Figure 8B:
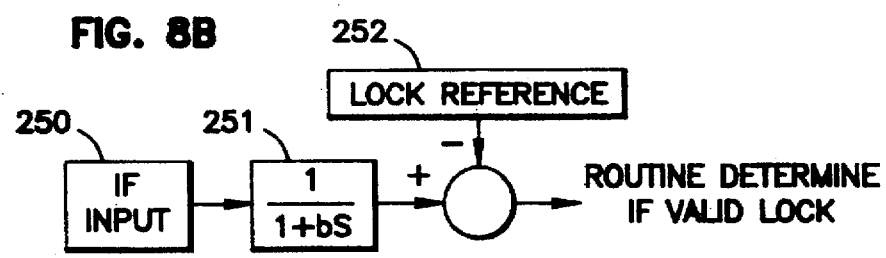
FIG. 8B is a loop diagram for implementing the "lock" references.

FIG. 8B is a loop diagram for implementing the "lock" references. The loop receives the IF input signal 250, applies the transfer function shown in element 251, combines the result with a lock reference signal 252, and then delivers the output to the search routine.

The system then checks the lower lock at step 36 for a valid reading. If the searching resulted in a valid target, the system then executes either an embedded or nonembedded search, depending upon whether the transmitted signal was embedded or nonembedded; otherwise, the system adjusts the search rate at step 37. If the maximum altitude was reached, as determined by step 38, the system returns to the beginning of the full search; otherwise, the system checks the upper limit of the range at step 38, since, for example, the previous search may have involved special limits that are no longer valid. The "range" of step 38 refers to a region of altitude where a particular format is transmitted. If necessary, the system updates the range at step 40 and then returns to the lower lock search routine.

The partial search routine is identical to the full search routine with the exception that the entry altitude is variable. With the partial search routine, a user can enter a desired starting point or altitude for the search, and the system then calls the same routine as for the full search.

Figure 9:
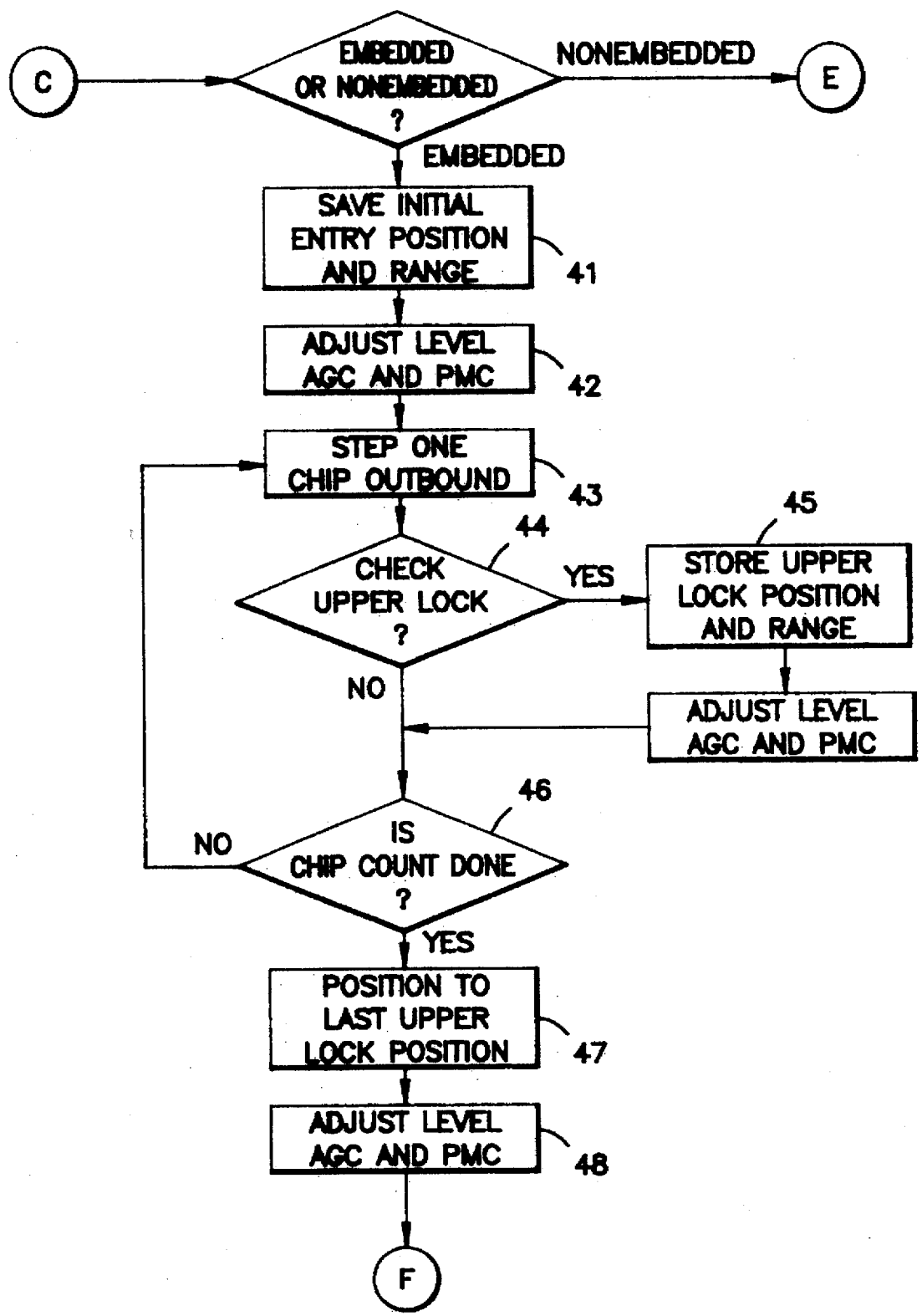
FIG. 9 is a flow chart of the embedded search routine.

FIG. 9 is a flow chart of the embedded search routine. Step 41 initializes the routine by saving the initial entry position and range. Step 42 initializes the AGC and PMC loops. The system steps the transmit pulse one "chip" width at step 43. The system checks the upper lock at step 44 and, if necessary, saves a new upper lock position and range at step 45. If the chip count is finished, as determined by step 46, the system positions the return gate to the last upper lock position at step 47 and adjusts the AGC and PMC loops at step 48.

Figure 10:
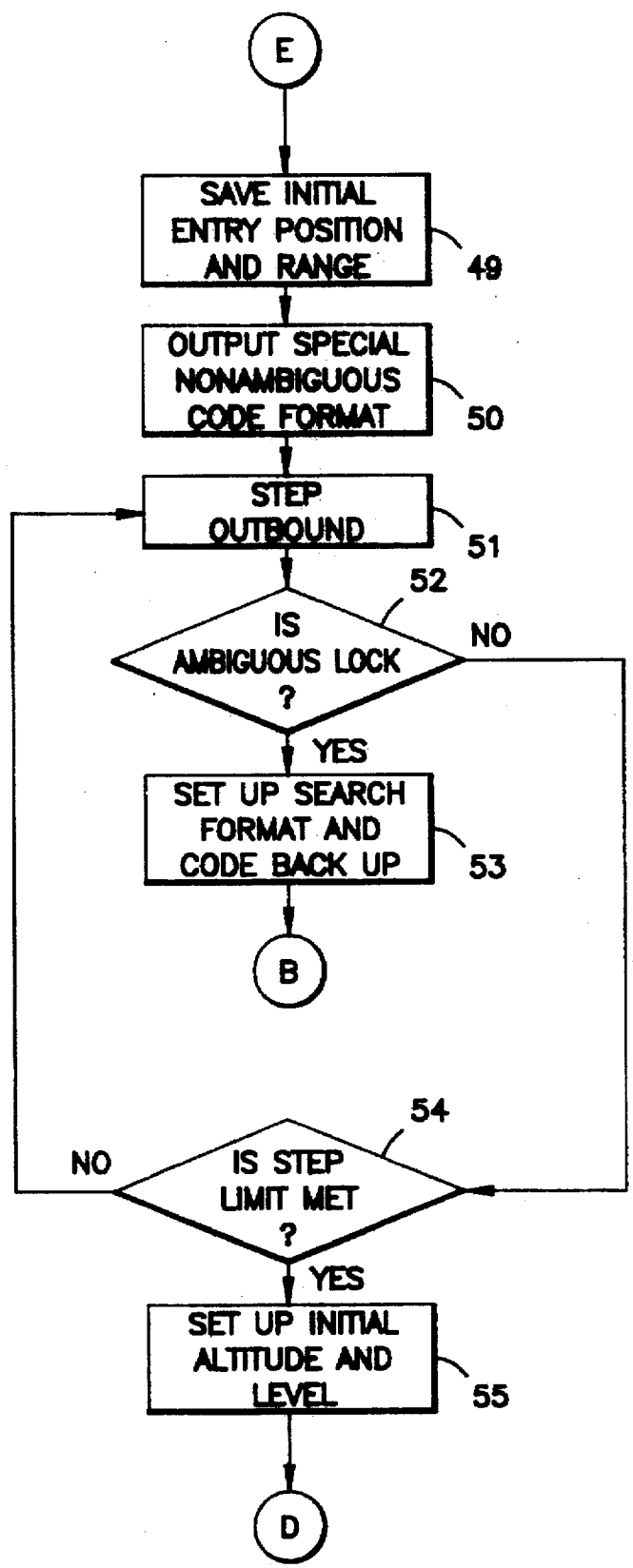
FIG. 10 is a flow chart of the nonembedded search routine.

FIG. 10 is a flow chart of the nonembedded search routine. Step 49 initializes the routine by saving the initial entry position and range. At steps 50–54, the system uses codes to correlate the return pulse. The particular code used may depend on the specific application of the radar altimeter. At step 55, the system sets up the initial altitude and level and then executes the search exit routine (steps 64 and 65 in FIG. 11).

Figure 11:
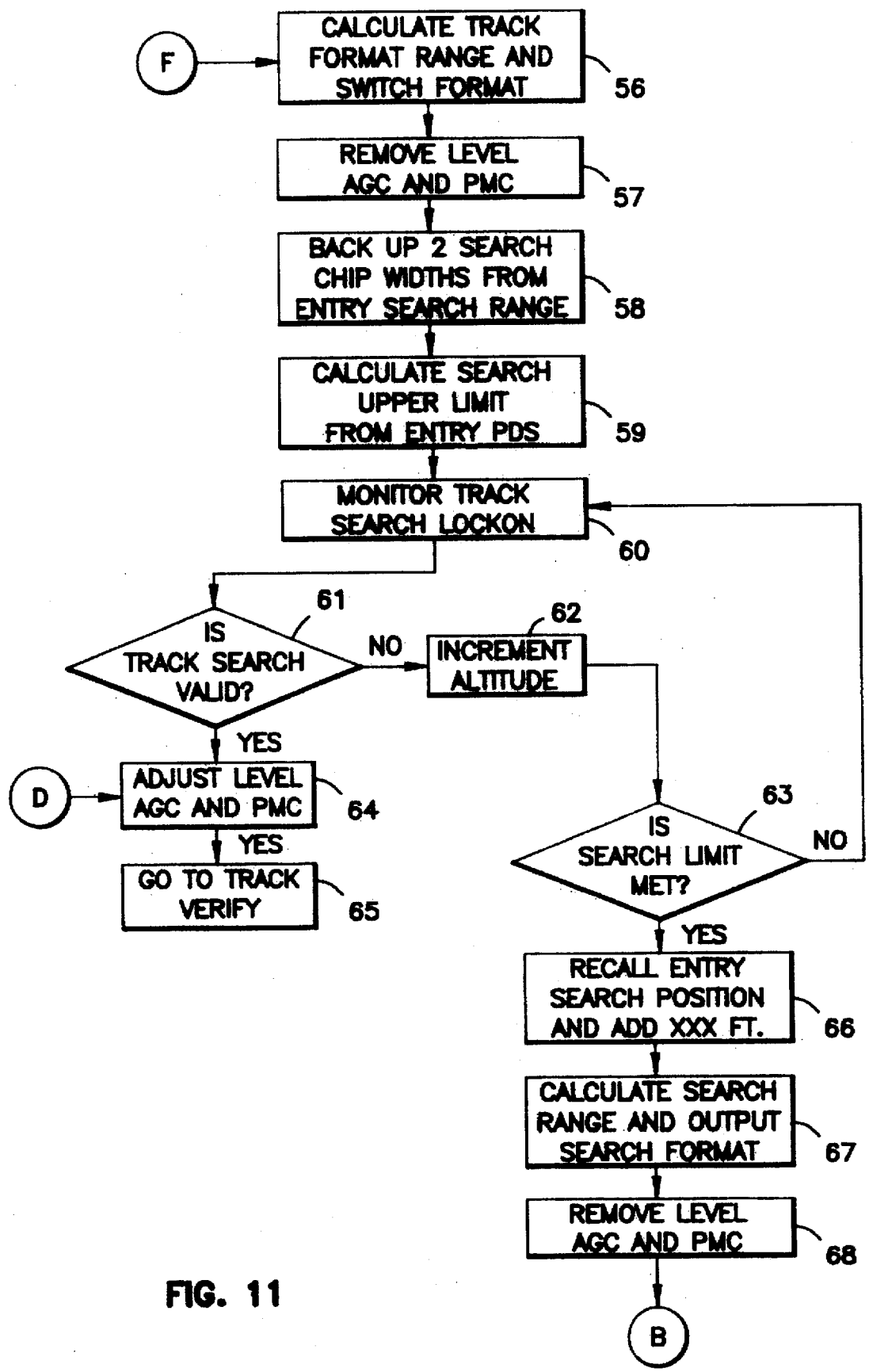
FIG. 11 is a flow chart of the track search routine.

FIG. 11 is a flow chart of the track search routine. Step 56 initializes the routine by calculating the track format and switching formats. Step 57 removes the AGC and PMC functions during the search routine. Steps 58–60 process the return chip pulses and monitor the return pulse to determine if it is valid. If the search produced a valid track, as determined by step 61, then the system restores the AGC and PMC functions at step 64 and jumps to the track verify routine at step 65. Otherwise, the system increments the altitude at step 62 to expand the search range and then determines if the search limit is met at step 63. If the search limit is not met, the system returns to monitoring the gate; otherwise, the system adjusts the search range at steps 66 and 67, restores the AGC and PMC functions at step 68, and then returns to the full search routine.

Figure 12:
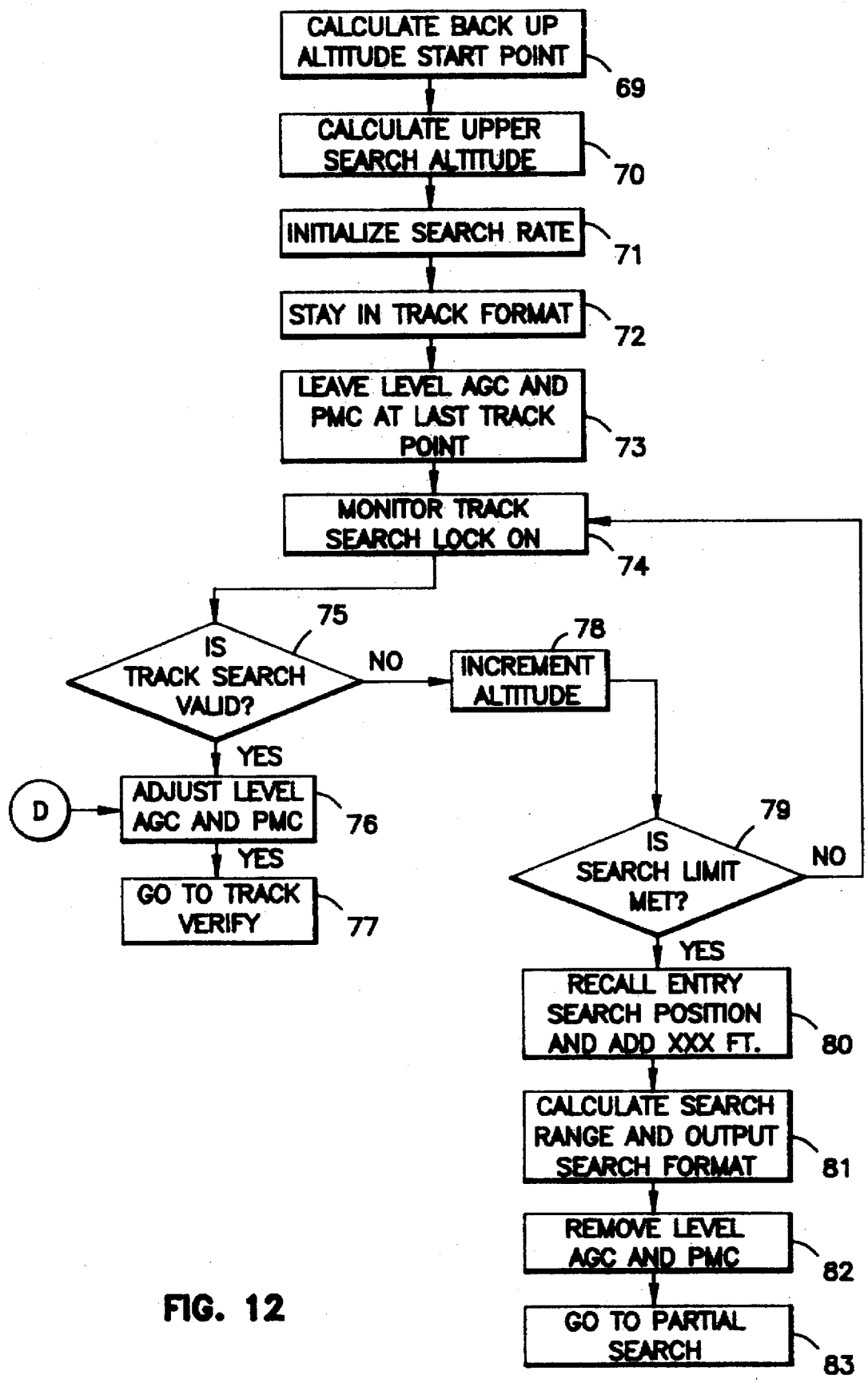
FIG. 12 is a flow chart of the break track search routine.

FIG. 12 is a flow chart of the break track search routine. Steps 69–73 perform initialization functions: step 69 calculates the back up altitude starting point; step 70 calculates the upper search altitude limit; step 71 initializes the search rate; step 72 maintains the system in the track format; and step 73 holds the AGC and PMC functions. Step 74 monitors the return pulse to determine if is valid. If the search produced a valid track, as determined by step 75, then the system restores the AGC and PMC functions at step 76 and jumps to the track verify routine at step 77. Otherwise, the system increases the range at step 80, calculates the new search range and format at step 81, restores the AGC and PMC functions at step 82, and then transfers control to the partial search routine at step 83.

FIGS. 13–16 are a flow chart of the track/verify routine. This routine includes both the track routine and the verify routine. The system uses the track routine to position the gate signal over the return signal in order to determine the leading edge of the return signal and thus determine the distance to the target. The system uses the verify routine to position and hold the gate signal over the return signal for maximum overlap; the system then integrates the return signal in the verify routine, using the AGC and PMC algorithms, to calculate the strength of the return signal.

Figure 13:
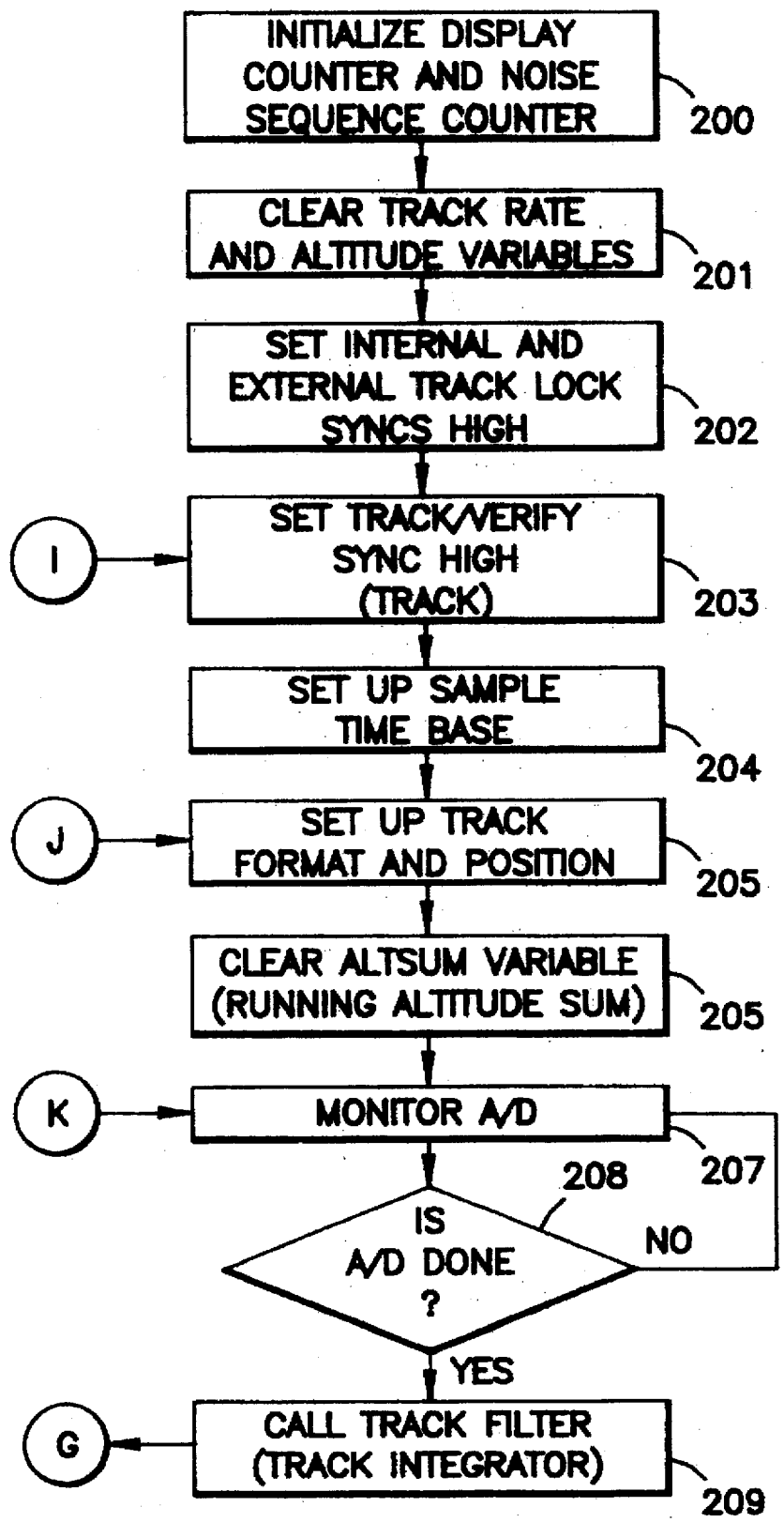
FIGS. 13–16 are a flow chart of the track/verify routine.

FIG. 13 is a flow chart of the first portion of the track/verify routine. The system typically first performs initialization of functions and variables, as shown in steps 200–206. The system initializes the display and noise counters at step 200. The system uses the display counter to calculate the update data rate to output devices. The receive gate counter indicates the time delay between the transmitted and return pulses and is thus proportional to the distance to the target. The system clears the track rate and altitude variables at step 201. At steps 202–206, the system sets up various functions in preparation for receiving and processing the digitized return pulse.

At steps 207 and 208, the system waits for the analog-to-digital converter (see FIG. 1A) to digitize an analog return pulse. After receiving the digitized return pulse, the system integrates the pulse in step 209 with the track integrator, as shown in the general track loop of FIG. 17. After additional processing of the result of step 209, as shown in the track loop of FIG. 17, the system can then output an indication of altitude or the distance to the target and can also reposition the return gate position.

Figure 14:
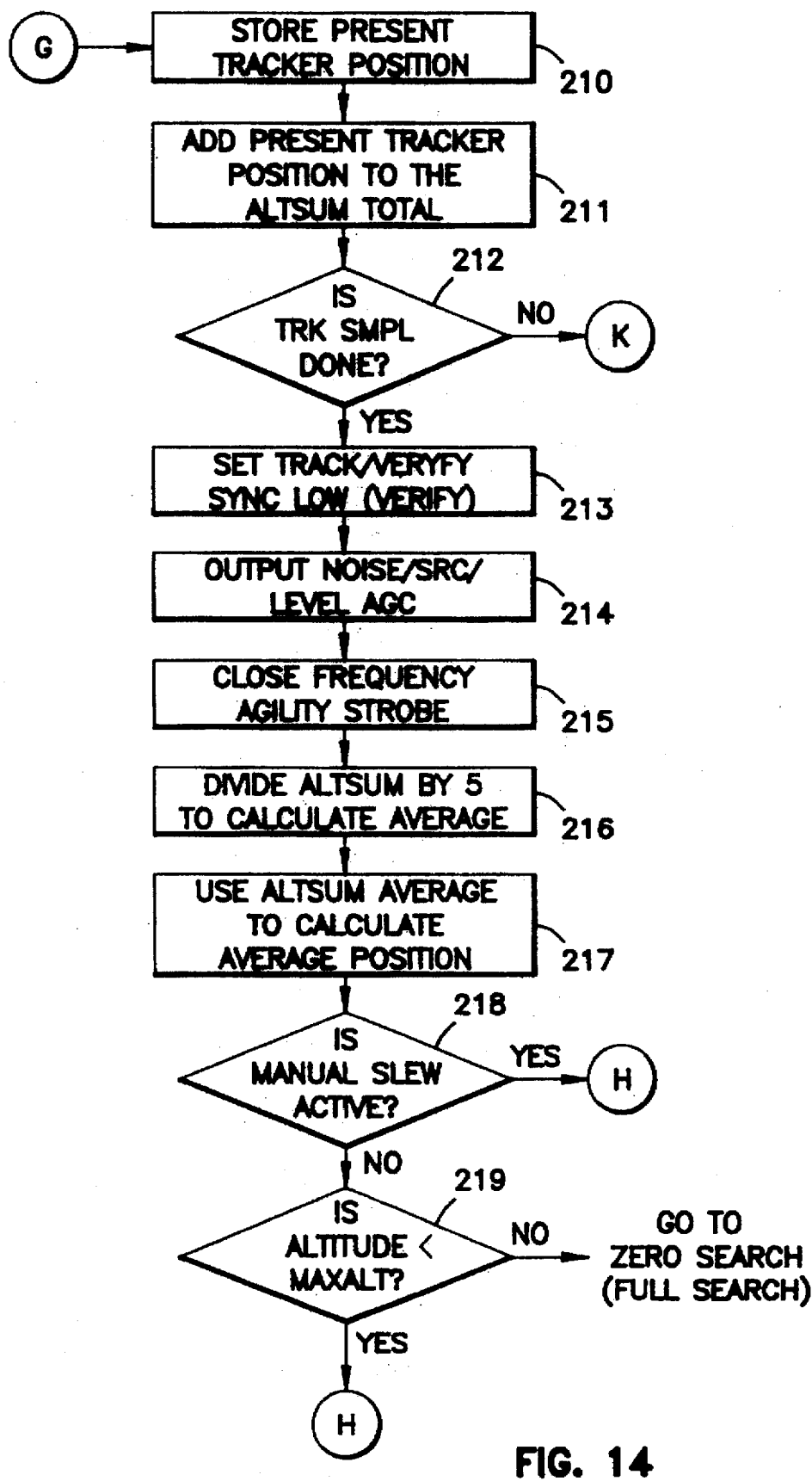
Figure 15:
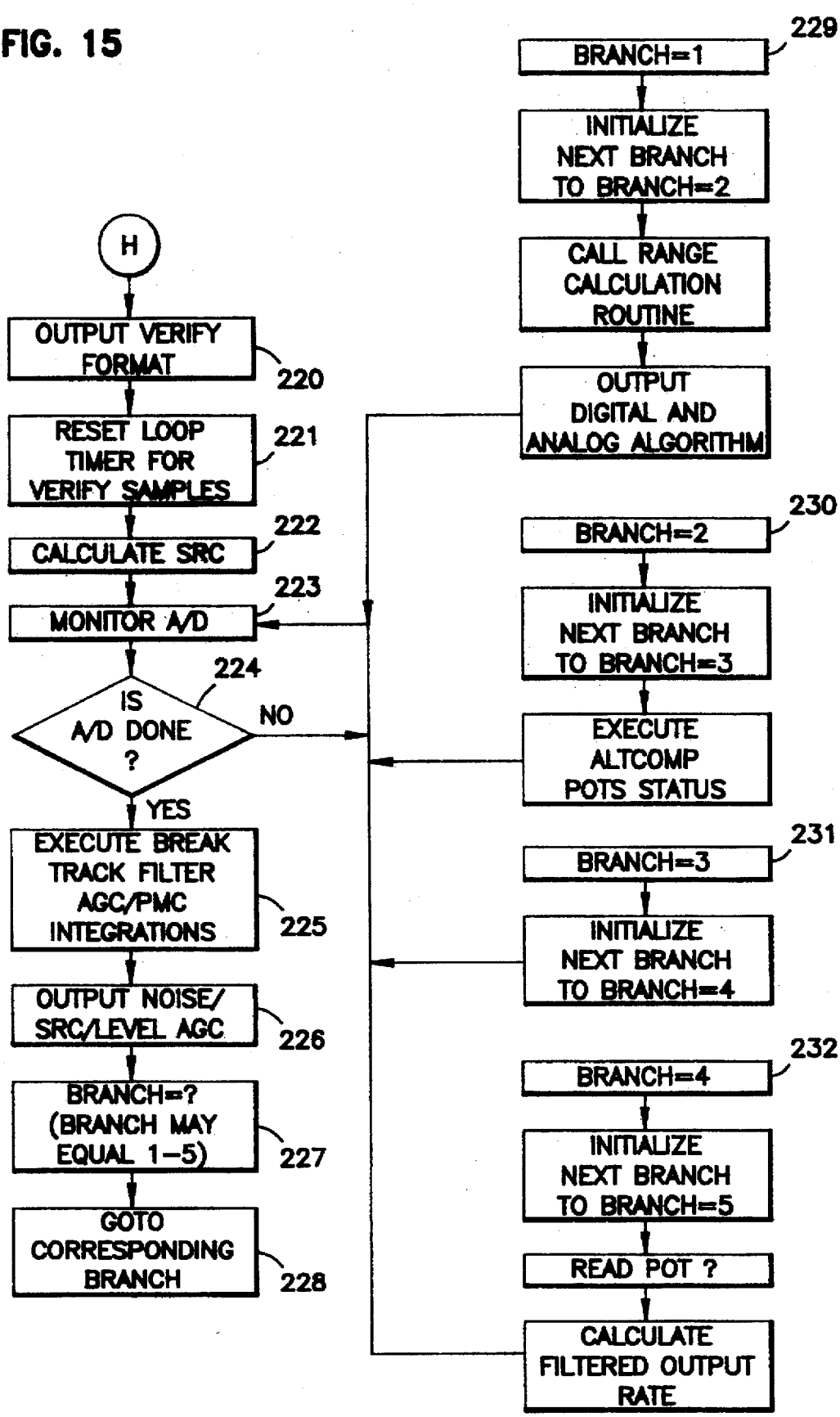
Figure 16:
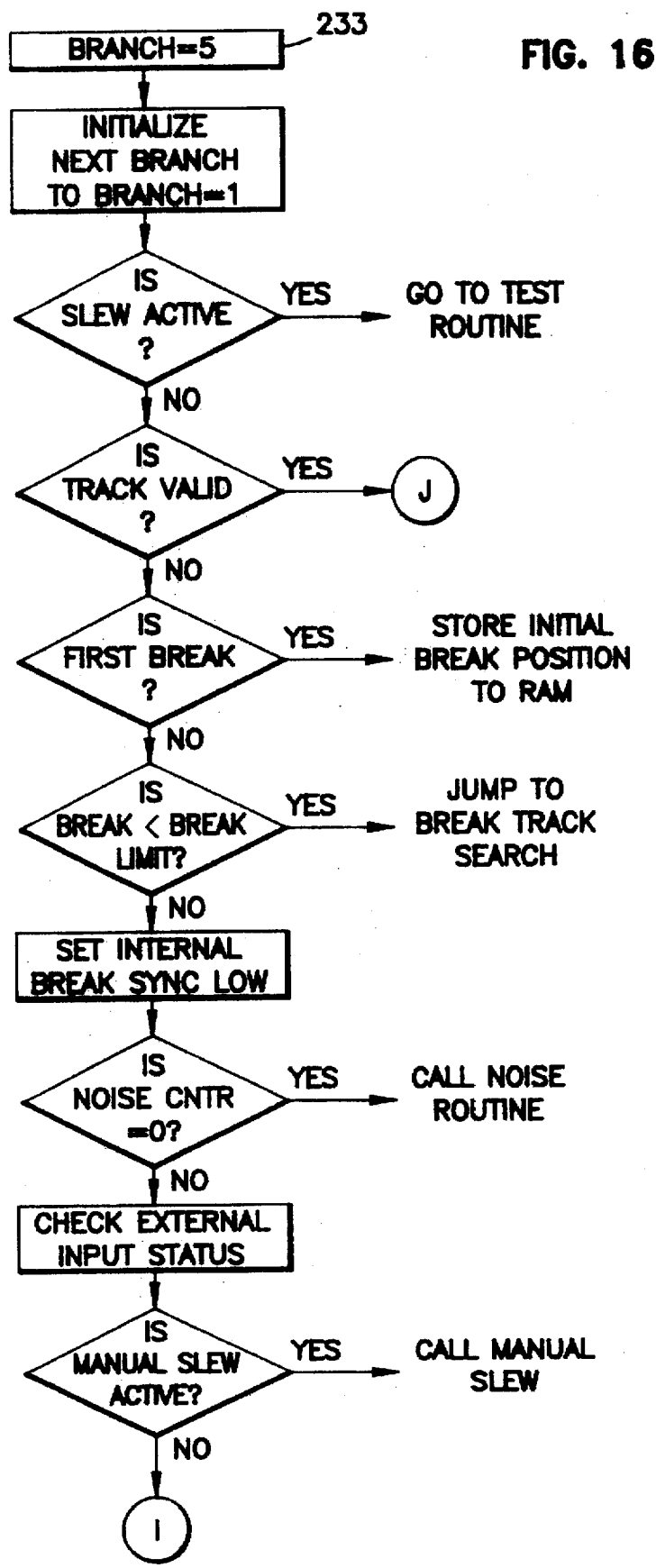

FIG. 14 is a flow chart of the second portion of the track/verify routine. The system uses steps 211–212 to position the gate for maximum overlap with the return pulse for the verify portion of the routine. At step 213, the system sets the track/verify sync for the verify function. The system performs initial processing of the return signal at steps 214–217. The slew indicator is checked at step 218. If the altitude, as determined from the track loop, is greater than the maximum altitude allowed by the preset range, then the system returns to the full search routine; otherwise, if the altitude is within range, the system proceeds to the next portion of the verify function, as shown in FIG. 15.

The system outputs the verify format at step 220. At steps 221 and 222, the system initializes a loop timer in preparation for obtaining additional return pulse samples and then calculates the SRC. At steps 223 and 224, the system waits for additional samples from the analog-to-digital converter (see FIG. 1A). The system executes the verify integrations (see the AGC and PMC loops of FIGS. 19 and 20) at step 225 and outputs the results at step 226. At step 227, the system determines which branch of the routine to execute. The number of branches used by the system may vary depending upon specific device requirements, such as output altitude data update rate. Finally, at step 228, the system jumps to the appropriate branch 1–5, as shown in subroutines 229–233.

CONTROL LOOPS

Figure 17:
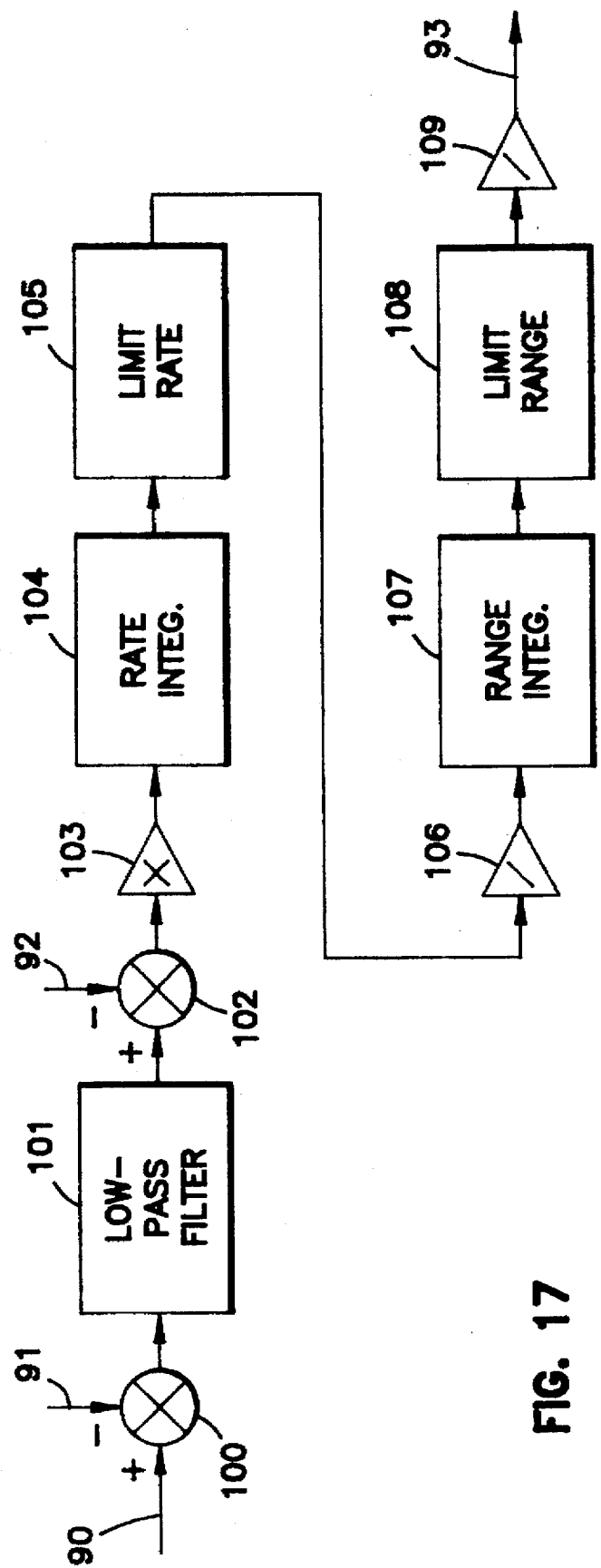
FIG. 17 is a diagram of the general track loop.

FIGS. 17–20 are diagrams that show the digital signal processing loops for the main functions of the software within microprocessor 15. FIG. 17 is a diagram of the general track loop, which processes the return signal to determine altitude or distance to the target. This loop receives a sampled and digitized radar return signal 90. Adder 100 adds the digitized input signal 90 with a noise reference signal 91. Filter 101 low pass filters the output of adder 100. Equation [1] defines the transfer function for low pass filter 101. In the equations: $K_o$=specific frequency of the filter; $V_o$=output of the filter; $V_i$=input to the filter; $Z^{-1}$ represents the time delay of the sample; and Z=present sample. $K_1$ and $K_2$ are determined from $K_o$. The equations are generated using the bilinear transform technique for digital signal processing.

$$\frac{1}{1+K_oS} \quad [1]$$

$$\frac{1}{V_o} = K1\{V_1(Z) + V_1(Z^{-1}) - K2V_O(Z^{-1})\}$$

A second adder 102 adds the output of low pass filter 101 with a track reference signal 92. Multiplier 103 multiplies the output of mixer 102 by a constant K1. Rate integrator 104 performs an integration, as defined by the transfer function in equation [2], of the output of multiplier 103.

$$\frac{1+K_\infty S}{K\beta} \quad [2]$$

$$V_o(Z) = V_o(Z^{-1}) + K_1 V_i(Z) - K_2 V_i(Z^{-1})$$

Limit rate element 105 limits the maximum track rate performance of the altimeter. Multiplier 106 multiplies the output of limit rate 105 by a constant K3. Range integrator 107 performs an integration, as defined by the transfer function in equation [3], of the output of multiplier 106.

$$\frac{K_o}{S} \quad [3]$$

$$V_O(Z) = \frac{1}{K1} \{V_i(Z) + V_i(Z^{-1})\} + V_O(Z^{-1})$$

Limit range element 108 limits the maximum altitude of the device. Finally, multiplier 109 multiplies the output of limit range 108 by a constant K5 for altitude scaling, resulting in an altitude output signal 93, which may be displayed by the digital output display 17 (see FIG. 1A).

Figure 18:
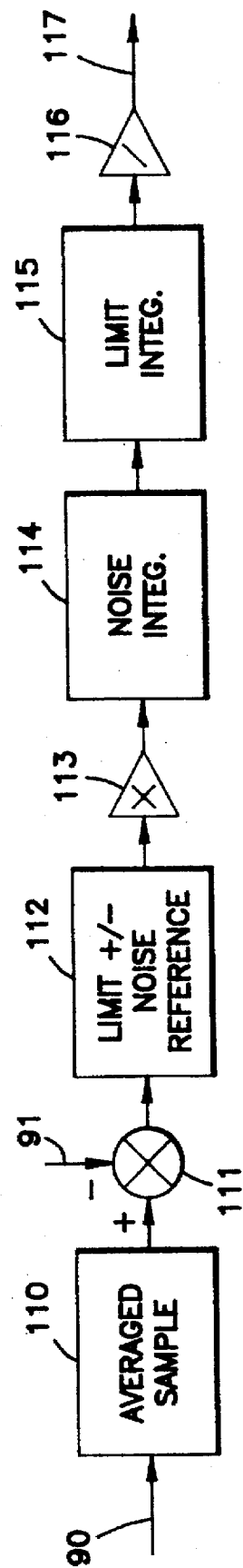
FIG. 18 is a diagram of the noise control loop.

FIG. 18 is a diagram of the noise control loop, which sets a nominal noise level in the system for distinguishing the radar return signal and also for determining jamming and interference. This loop also receives the sampled input signal 90. Element 110 determines the average of a number of the input samples, which in a preferred embodiment is eight samples. The system may use more or less samples to determine the average; the main criterion is that a sufficient number of samples are used to obtain a reliable average value.

Adder 112 combines the average value signal with the noise reference signal 91. Element 112 limits the adder output to the noise reference value. Multiplier 113 multiplies the output of element 112 by a constant gain factor NGAIN. Noise integrator 114 performs an integration, as defined by the transfer function in equation [4], of the output of multiplier 113.

$$\frac{K_o}{S} \quad [4]$$

$$V_O(Z) = \frac{1}{K} \{V_i(Z) + V_i(Z^{-1})\} + V_O(Z^{-1})$$

Element 115 limits the noise integrator output to a functional limit defined by the D/A. Finally, multiplier 116 multiplies the output of element 115 by a constant, NSCALE=K2, resulting in an output control signal 117 that is converted to an analog signal and delivered to the receiver.

Figure 19:
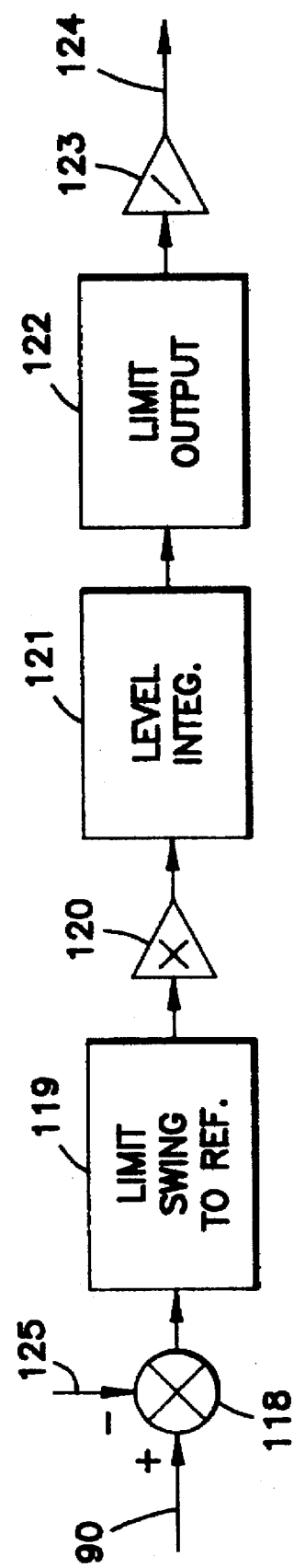
FIG. 19 is a diagram of the general automatic gain control loop.

FIG. 19 is a diagram of the general AGC loop, which controls the strength of the received radar return signal. This loop also receives the sampled input signal 90. Adder 118 combines the sampled input signal 90 with an AGC level reference signal 125. Element 119 limits the signal swing to the AGC reference level. Multiplier 120 multiplies the output of element 119 by a constant K1. Level integrator 121 performs an integration, as defined by the transfer function in equation [5], of the output of multiplier 120.

$$\frac{K_O}{S} \quad [5]$$

$$V_O(Z) = \frac{1}{K1}\{V_i(Z) + V_i(Z^{-1})\} + V_O(Z^{-1})$$

Element 122 limits the AGC integrator output to a functional limit defined by the AGC D/A. Finally, multiplier 123 multiplies the output of element 122 by a constant K3, resulting in an output control signal 124 that is converted to an analog signal and delivered to the receiver.

Figure 20:
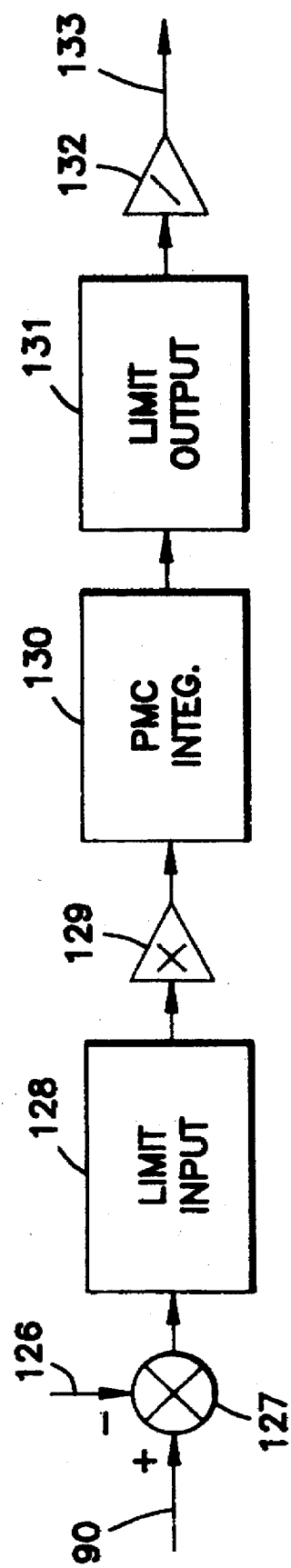
FIG. 20 is a diagram of the general power management control loop.

FIG. 20 is a diagram of the general PMC loop, which reduces transmitted power to maintain the proper signal level processed by the AGC and PMC loops. This loop also receives the sampled input signal 90. Element 128 limits the signal swing to the PMC level reference. Multiplier 129 multiplies the output of element 128 by a constant K1. PMC integrator 130 performs an integration with a gain of K2, as defined by the transfer function in equation [6], of the output of multiplier 129.

$$\frac{1+bS}{aS} \quad \text{OR} \quad \frac{1}{aS} \quad [6]$$

Element 131 limits the PMC integrator output to a functional limit defined by the PMC D/A. Finally, multiplier 132 multiplies the output of element 131 by a constant K3, to resulting in an output control signal 133 that is converted to an analog signal and delivered to the transmitter.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A radar altimeter signal processing system for sending and receiving radar signals to and from a target and for digital signal processing of digital radar data related to the radar signals in order to determine a distance to the target, comprising:

a) transmitter means for transmitting a radar signal to the target;

b) receiver means for receiving a reflected radar signal from the target;

c) input/output means, coupled to the transmitter means and the receiver means, for transceiving digital radar data related to the radar signals;

d) conversion means, coupled between the receiver means and the input/output means, for converting the received radar signals into the digital radar data; and e) a microprocessor comprising storage means for storing a physically-encoded embodiment of subsystem software which implements the system, the microprocessor further comprising processing means for implementing the subsystem software and communication means for sending and receiving the digital radar data to and from the input/output means; and f) subsystem software means, physically-encoded in the storage means, for processing the digital radar data in order to generate an output signal representing the distance to the target wherein changes to the subsystem software means are made to tailor the subsystem software means to various aircraft parameters in specific situations.

2. The system of claim 1, further comprising output means, coupled to the microprocessor, for receiving the output signal and for providing a visual indication of the distance to the target.

3. The system of claim 1 wherein the subsystem software means comprises:

a) receive means for receiving a digital return signal corresponding to the reflected radar signal;

b) gate means for generating a digital track gate signal; and c) integration means for integrating the digital return signal over the track gate signal, the integration means comprising positioning means for positioning the track gate signal over the digital return signal such that a result of the integration provides an indication of a leading edge of the reflected radar signal.

4. The system of claim 1 wherein the subsystem software means comprises: a) receive means for receiving a digital return signal corresponding to the reflected radar signal; b) gate means for generating a digital verify gate signal; and c) integration means for integrating the digital return signal over the verify gate signal, the integration means comprising positioning means for positioning the gate signal for maximum overlap with the digital return signal such that a result of the integration provides an indication of a maximum strength of the reflected radar signal.

5. The system of claim 1 wherein the subsystem software means comprises transmit signal means for generating a series of pulses and for transmitting the pulses to the input/output means.

* * * * *